United States Patent
Fukao et al.

(10) Patent No.: US 10,066,746 B2
(45) Date of Patent: Sep. 4, 2018

(54) DRIVING SYSTEM FOR VEHICLE

(71) Applicant: TOYOTA JIDOSHA KABUSHIKI KAISHA, Toyota-shi, Aichi-ken (JP)

(72) Inventors: Mitsuhiro Fukao, Toyota (JP); Hiroki Kondo, Miyoshi (JP); Akira Hino, Toyota (JP); Atsushi Ayabe, Toyota (JP); Daisuke Inoue, Toyota (JP); Akihide Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/316,674

(22) PCT Filed: Jun. 12, 2015

(86) PCT No.: PCT/IB2015/001001
§ 371 (c)(1),
(2) Date: Dec. 6, 2016

(87) PCT Pub. No.: WO2015/189688
PCT Pub. Date: Dec. 17, 2015

(65) Prior Publication Data
US 2017/0159814 A1   Jun. 8, 2017

(30) Foreign Application Priority Data
Jun. 13, 2014  (JP) ................... 2014-122875

(51) Int. Cl.
*F16H 61/662*   (2006.01)
*F16H 37/08*    (2006.01)

(52) U.S. Cl.
CPC ... *F16H 61/66272* (2013.01); *F16H 37/0846* (2013.01); *F16H 2037/0866* (2013.01)

(58) Field of Classification Search
CPC ......... F16H 61/66272; F16H 61/66231; F16H 37/0846; F16H 2037/0866; F16H 61/662
See application file for complete search history.

(56) References Cited

U.S. PATENT DOCUMENTS

| | | | |
|---|---|---|---|
| 2004/0209719 A1 | 10/2004 | Ochiai et al. | |
| 2006/0183581 A1* | 8/2006 | Iwatsuki | ........... F16H 61/66272 474/8 |
| 2010/0160111 A1 | 6/2010 | Yamanaka et al. | |
| 2010/0318270 A1* | 12/2010 | Yamanaka | ............ B60W 10/06 701/58 |
| 2012/0115678 A1* | 5/2012 | Doihara | ............ F16H 61/66272 477/46 |
| 2014/0221154 A1* | 8/2014 | Tatewaki | ................ F16H 61/12 477/45 |
| 2015/0087463 A1 | 3/2015 | Nakagawa et al. | |

FOREIGN PATENT DOCUMENTS

| | | |
|---|---|---|
| EP | 2 853 779 A1 | 4/2015 |
| JP | 2004-316843 A | 11/2004 |
| JP | 2010-242935 A | 10/2010 |
| WO | 2013/176208 A1 | 11/2013 |

* cited by examiner

*Primary Examiner* — Huan Le
(74) *Attorney, Agent, or Firm* — Oliff PLC (57) ABSTRACT

In a region in which a rate of change in slip ratio of a transmission belt with respect to a change in input torque exceeds a permissible slip ratio rate of change set in advance, a steep change in the slip ratio is suppressed by limiting the rate of change in the input torque.

3 Claims, 5 Drawing Sheets

DRIVING SYSTEM FOR VEHICLE

BACKGROUND OF THE INVENTION

1. Field of the Invention

The invention relates to a driving system for a vehicle and, more particularly, to control over a driving system for a vehicle including a continuously variable transmission mechanism and a gear mechanism in parallel with each other.

2. Description of Related Art

There has been suggested a driving system for a vehicle. The driving system includes a continuously variable transmission mechanism, a gear mechanism, and a clutch mechanism between an input shaft and an output shaft. Torque output from a driving force source is transmitted to the input shaft. The output shaft outputs torque to drive wheels. The continuously variable transmission mechanism is able to steplessly change speed ratios. The gear mechanism has at least one gear ratio. The clutch mechanism selectively changes a torque transmission path between a first transmission path and a second transmission path. The first transmission path allows torque to be transmitted via the continuously variable transmission mechanism. The second transmission path allows torque to be transmitted via the gear mechanism. This is, for example, a driving system for a vehicle, described in International Application Publication No. 2013/176208.

International Application Publication No. 2013/176208 describes the driving system for a vehicle, in which a torque transmission path (first transmission path) and a torque transmission path (second transmission path) are provided in parallel with each other. The torque transmission path (first transmission path) includes a continuously variable transmission mechanism that is able to continuously change a speed ratio. The torque transmission path (second transmission path) includes a gear train (gear mechanism) having at least one gear ratio that cannot be set by the continuously variable transmission mechanism. More specifically, the torque transmission path including the gear train is established by connecting a first clutch mechanism and a third clutch mechanism. The first clutch mechanism couples at least two rotating elements selected from among an input element, an output element and a reaction element of a forward/reverse switching mechanism. The forward/reverse switching mechanism is formed of three rotating elements that are able to differentially operate. The third clutch mechanism connects the gear train to an output shaft or disconnects the gear train from the output shaft. Alternatively, the torque transmission path including the continuously variable transmission mechanism is established by connecting a second clutch mechanism. The second clutch mechanism connects a secondary shaft of the continuously variable transmission mechanism to the output shaft or disconnects the secondary shaft from the output shaft. A belt-type continuously variable transmission mechanism is employed as the continuously variable transmission mechanism. The belt-type continuously variable transmission mechanism includes a primary pulley, a secondary pulley and a transmission belt. The primary pulley is coupled to an input shaft. The secondary pulley is coupled to the output shaft. The transmission belt is wound so as to span between the primary pulley and the secondary pulley.

SUMMARY OF THE INVENTION

Incidentally, in the configuration that the torque transmission path is selectively changed by the clutch mechanisms between the first transmission path including the continuously variable transmission mechanism and the second transmission path including the gear mechanism, as described in International Application Publication No. 2013/176208, input torque to the continuously variable transmission mechanism steeply changes at the time when the clutch mechanisms that change the torque transmission path are engaged or released. At this time, a slip ratio of the transmission belt of the continuously variable transmission mechanism also significantly changes with the input torque. Particularly, in a state where a speed ratio γ of the continuously variable transmission mechanism is larger than 1, a change in the slip ratio increases. When a change in the slip ratio of the transmission belt increases, a load on the transmission belt due to the change in the slip ratio increases, which may lead to a decrease in the durability of the transmission belt.

The invention provides a driving system for a vehicle including a continuously variable transmission mechanism and a gear mechanism in parallel with each other, which suppresses a decrease in the durability of a transmission belt due to an increased change in slip ratio at the time when a torque transmission path is changed between a first transmission path including the continuously variable transmission mechanism and a second transmission path including the gear mechanism.

A first aspect of the invention provides a driving system for a vehicle. The vehicle includes a driving force source, a drive wheel, a continuously variable transmission mechanism, a gear mechanism, and a clutch mechanism. The continuously variable transmission mechanism includes an input shaft, an output shaft, a pair of pulleys, and a transmission belt. Torque output from the driving force source is transmitted to the input shaft. The output shaft is configured to output torque to the drive wheel. The transmission belt is arranged between the input shaft and the output shaft. The transmission belt is wound so as to span between the pair of pulleys. The gear mechanism has at least one gear ratio. The clutch mechanism is configured to selectively change a torque transmission path between a first path and a second path. The first path is a path through which torque is transmitted via the continuously variable transmission mechanism. The second path is a path through which torque is transmitted via the gear mechanism. The driving system includes at least one electronic control unit. The at least one electronic control unit is configured to i) selectively change the torque transmission path between the first path and the second path on the basis of a traveling state of the vehicle, and ii) when the torque transmission path is changed between the first path and the second path by operating the clutch mechanism, and when a rate of change in slip ratio of the transmission belt with respect to a change in input torque that is input to the continuously variable transmission mechanism exceeds a predetermined reference value, control the input torque such that the rate of change in the input torque is limited to a value lower than or equal to a predetermined upper limit rate of change.

With this configuration, in a region in which the rate of change in the slip ratio of the transmission belt with respect to the change in the input torque exceeds the predetermined reference value, a steep change in the slip ratio is suppressed by limiting the rate of change in the input torque. Because a steep change in the slip ratio is suppressed, a load on the transmission belt is suppressed, so it is possible to suppress a decrease in the durability of the transmission belt.

A second aspect of the invention provides a driving system for a vehicle. The vehicle includes a driving force source, a drive wheel, a continuously variable transmission mechanism, a gear mechanism, and a clutch mechanism. The continuously variable transmission mechanism includes an input shaft, an output shaft, a pair of pulleys, and a transmission belt. Torque output from the driving force source is transmitted to the input shaft. The output shaft is configured to output torque to the drive wheel. The transmission belt is arranged between the input shaft and the output shaft. The transmission belt is wound so as to span between the pair of pulleys. The gear mechanism has at least one gear ratio. The clutch mechanism is configured to selectively change a torque transmission path between a first path and a second path. The first path is a path through which torque is transmitted via the continuously variable transmission mechanism. The second path is a path through which torque is transmitted via the gear mechanism. The driving system includes at least one electronic control unit. The at least one electronic control unit is configured to i) selectively change the torque transmission path between the first path and the second path on the basis of a traveling state of the vehicle, and ii) when the torque transmission path is changed between the first path and the second path by operating the clutch mechanism, a) calculate a rate of change in actual slip ratio of the transmission belt, and b) when the calculated rate of change in the actual slip ratio is higher than a predetermined threshold set in advance, control input torque that is input to the continuously variable transmission mechanism such that a rate of change in the input torque is limited to a value lower than or equal to a predetermined upper limit rate of change.

With this configuration, when the rate of change in the actual slip ratio is higher than the predetermined threshold set in advance, a steep change in the slip ratio is suppressed by limiting the rate of change in the input torque that is input to the continuously variable transmission mechanism. Because a steep change in the slip ratio is suppressed, a load on the transmission belt is suppressed, so it is possible to suppress a decrease in the durability of the transmission belt.

The above aspects may be configured as follows. The clutch mechanism includes a first clutch and a second clutch. The first clutch is a hydraulic clutch, and the first path is established when the first clutch is engaged. The second clutch is a hydraulic clutch, and the second path is established when the second clutch is engaged. The electronic control unit is configured to limit the rate of change in the input torque, which is input to the continuously variable transmission mechanism, to a value lower than or equal to the predetermined upper limit rate of change by controlling clutch hydraulic pressures for changing engaged/released states of the first clutch and second clutch.

The above aspects may be configured as follows. The electronic control unit is configured to limit the rate of change in the input torque, which is input to the continuously variable transmission mechanism, to a value lower than or equal to the predetermined upper limit rate of change by controlling an output of the driving force source.

In the driving system for a vehicle according to the above aspects, the transmission belt includes an endless annular ring and a plurality of elements are held by the ring and are continuously provided along the ring. Because the plurality of elements are held by the ring of the transmission belt and stacked along the ring, an increase in the rate of change in the slip ratio increases impact torque (impulse) that is generated at the time when any adjacent two of the plurality of stacked elements get close to each other. Thus, the amount of abrasion due to a collision between any adjacent elements, which occurs at the time when the elements get close to each other, increases. In contrast, because there is the predetermined upper limit value on the rate of change in the input torque, the amount of abrasion between any adjacent elements is reduced as a result of a reduction in the impact torque (impulse), so a decrease in the durability of the transmission belt is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. In the following embodiment, the drawings are modified or simplified where appropriate, and the scale ratio, shape, and the like, of each portion are not always drawn accurately.

Figure 1:
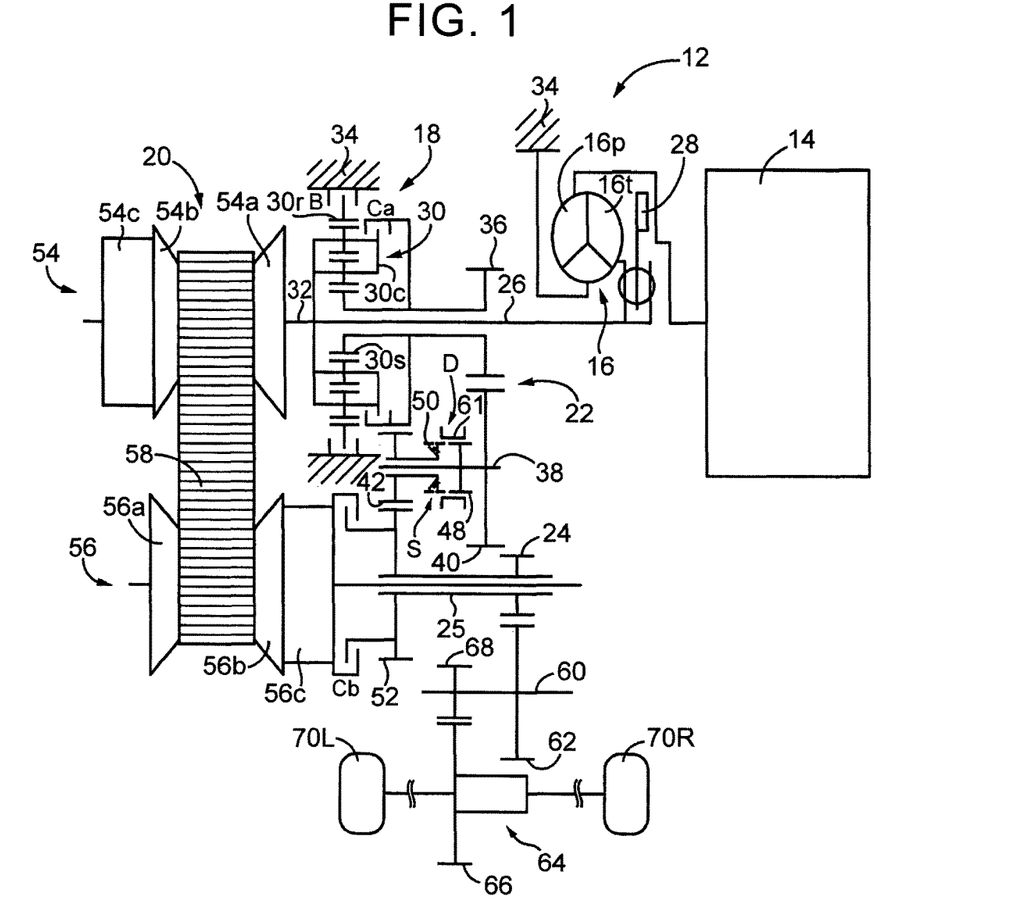
FIG. 1 is a skeletal view for illustrating the schematic configuration of a driving system for a vehicle according to an embodiment of the invention.

FIG. 1 is a skeletal view for illustrating the schematic configuration of a driving system 12 for a vehicle (hereinafter, driving system 12) according to the embodiment of the invention. The driving system 12, for example, includes an engine 14, a torque converter 16, a forward/reverse switching device 18, a belt-type continuously variable transmission mechanism 20 (hereinafter, continuously variable transmission mechanism 20), a gear mechanism 22, an output shaft 25, and a differential gear 64. The engine 14 is used as a driving force source for propelling the vehicle. The torque converter 16 serves as a fluid transmission device. The output shaft 25 has an output gear 24 that is able to transmit power to drive wheels 70. In the driving system 12, the continuously variable transmission mechanism 20 and the gear mechanism 22 are provided in parallel with each other between a turbine shaft 26 and the output shaft 25. Thus, a first transmission path and a second transmission path are provided. The first transmission path and the second transmission path are configured to be selectively changed on the basis of a traveling state of the vehicle. In the first transmission path, torque that is output from the engine 14 is transmitted to the turbine shaft 26 via the torque converter 16, and the torque is transmitted from the turbine shaft 26 to the output shaft 25 via the continuously variable transmission mechanism 20. In the second transmission path, torque that is output from the engine 14 is transmitted to the turbine shaft 26 via the torque converter 16, and the torque is transmitted from the turbine shaft 26 to the output shaft 25 via the gear mechanism 22. The turbine shaft 26 corresponds to an input shaft according to the invention.

The engine 14 functions as a driving force source. The engine 14 is, for example, an internal combustion engine, such as a gasoline engine and a diesel engine. The torque converter 16 includes a pump impeller 16$p$ and a turbine impeller 16$t$, and is configured to transmit power via fluid. The pump impeller 16$p$ is coupled to a crankshaft of the engine 14. The turbine impeller 16$t$ is coupled to the forward/reverse switching device 18 via the turbine shaft 26 that corresponds to an output-side member of the torque converter 16. A lockup clutch 28 is provided between the pump impeller 16$p$ and the turbine impeller 16$t$. When the lockup clutch 28 is completely engaged, the pump impeller 16$p$ and the turbine impeller 16$t$ are integrally rotated.

The forward/reverse switching device 18 is mainly formed of a forward clutch Ca, a reverse brake B, and a double-pinion-type planetary gear train 30. A carrier 30$c$ is integrally coupled to the turbine shaft 26 of the torque converter 16 and the input shaft 32 of the continuously variable transmission mechanism 20. A ring gear 30$r$ is selectively coupled to a housing 34 via the reverse brake B. The housing 34 serves as a non-rotating member. A sun gear 30$s$ is connected to a small-diameter gear 36. The sun gear 30$s$ and the carrier 30$c$ are selectively coupled to each other via the forward clutch Ca. Each of the forward clutch Ca and the reverse brake B corresponds to a disconnect device, and is a hydraulic friction engagement device that is frictionally engaged by a hydraulic actuator.

The sun gear 30$s$ of the planetary gear train 30 is coupled to the small-diameter gear 36 that constitutes the gear mechanism 22. The gear mechanism 22 includes the small-diameter gear 36 and a large-diameter gear 40. The large-diameter gear 40 is provided on a first counter shaft 38 so as to be relatively non-rotatable. An idler gear 42 is provided around the same rotation axis as that of the first counter shaft 38 so as to be relatively rotatable with respect to the first counter shaft 38. A dog clutch D is provided between the first counter shaft 38 and the idler gear 42. The dog clutch D selectively connects the first counter shaft 38 to the idler gear 42 or disconnects the first counter shaft 38 from the idler gear 42. The dog clutch D includes a first gear 48, a second gear 50 and a hub sleeve 61. The first gear 48 is provided on the first counter shaft 38. The second gear 50 is provided on the idler gear 42. The hub sleeve 61 has spline teeth. The spline teeth 70 are able to be fitted to (be engaged with, be meshed with) these first gear 48 and second gear 50. When the hub sleeve 61 is fitted to these first gear 48 and second gear 50, the first counter shaft 38 is connected to the idler gear 42. The dog clutch D further includes a synchromesh mechanism S. The synchromesh mechanism S serves as a synchronization mechanism that synchronizes rotations at the time of fitting the first gear 48 to the second gear 50.

The idler gear 42 is in mesh with an input gear 52 having a larger diameter than the idler gear 42. The input gear 52 is provided so as to be relatively non-rotatable with respect to the output shaft 25. The output shaft 25 is arranged along a rotation axis common to the rotation axis of a secondary pulley 56 (described later) of the continuously variable transmission mechanism 20. The output shaft 25 is arranged so as to be rotatable around the rotation axis. The input gear 52 and the output gear 24 are provided on the output shaft 25 so as to be relatively non-rotatable. The forward clutch Ca, the reverse brake B and the dog clutch D are inserted in the second transmission path through which torque of the engine 14 is transmitted from the turbine shaft 26 to the output shaft 25 via the gear mechanism 22.

The continuously variable transmission mechanism 20 is provided in a torque transmission path between the turbine shaft 26 and the output shaft 25. The turbine shaft 26 functions as an input shaft. The continuously variable transmission mechanism 20 includes a primary pulley 54 (variable pulley 54), the secondary pulley 56 (variable pulley 56) and a transmission belt 58. The primary pulley 54 is an input-side member coupled to the turbine shaft 26 via a primary shaft 32, and has a variable effective diameter. The secondary pulley 56 is an output-side member coupled to the output shaft 25 via a belt driving clutch Cb (described later), and has a variable effective diameter. The transmission belt 58 is wound around the pair of variable pulleys 54, 56 so as to span between the pair of variable pulleys 54, 56. Power is transmitted via friction force between the pair of variable pulleys 54, 56 and the transmission belt 58. The primary pulley 54 and the secondary pulley 56 correspond to a pair of pulleys according to the invention.

Figure 2:
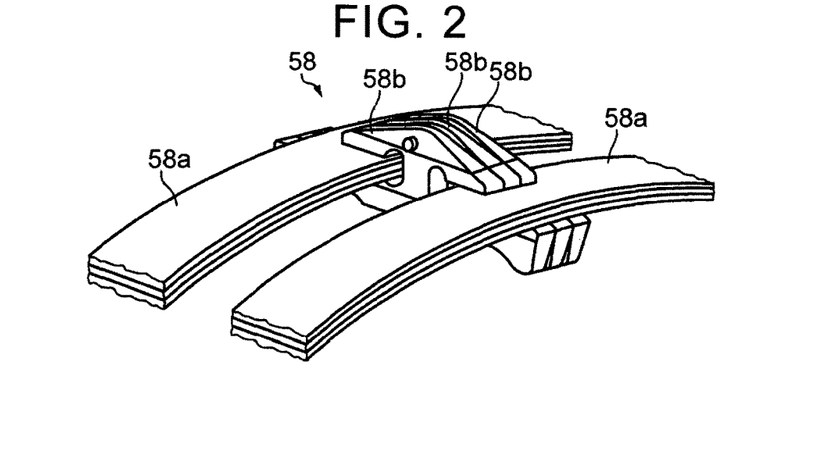
FIG. 2 is an enlarged view of a transmission belt of a continuously variable transmission mechanism that constitutes the driving system for a vehicle shown in FIG. 1.

FIG. 2 shows the structure of the transmission belt 58. The transmission belt 58 includes a pair of annular rings 58$a$ and a plurality of elements (bridges) 58$b$. Each of the pair of annular rings 58$a$ is formed of multiple stacked endless annular band steels. The plurality of elements 58$b$ are held by those pair of annular rings 58$a$. The plurality of elements 58$b$ are formed of a plurality of plate-shaped metals that are successively provided in an annular manner in the thickness direction along the annular rings 58$a$. Each annular ring 58$a$ is, for example, formed by shaping about 0.2-mm-thick high-tensile steel sheets and laminating the high-tensile steel sheets from the radially inner side toward the radially outer side. In the present embodiment, the number of the laminated high-tensile steel sheets is, for example, about nine. Each element 58$b$ is a thick plate-shaped piece formed by stamping, for example, about 1.8-mm-thick flat sheet material (steel sheet) into a shape. In file present embodiment, for example, about 400 elements 58$b$ are provided in the single transmission belt 58.

Referring back to FIG. 1, the primary pulley 54 includes a fixed sheave 54$a$, a movable sheave 54$b$, and a primary hydraulic actuator 54c. The fixed sheave 54a serves as an input-side fixed rotor fixed to the primary shaft 32. The movable sheave 54b serves as an input-side movable rotor provided so as to be relatively non-rotatable around its axis and movable in the axial direction with respect to the primary shaft 32. The primary hydraulic actuator 54c generates thrust for moving the movable sheave 54b in order to change the V-groove width between the fixed sheave 54a and the movable sheave 54b. The secondary pulley 56 includes a fixed sheave 56a, a movable sheave 56b, and a secondary hydraulic actuator 56c. The fixed sheave 56a serves as an output-side fixed rotor. The movable sheave 56b serves as an output-side movable rotor provided so as to be relatively non-rotatable around its axis and movable in the axial direction with respect to the fixed sheave 56a. The secondary hydraulic actuator 56c generates thrust for moving the movable sheave 56b in order to change the V-groove width between the fixed sheave 56a and the movable sheave 56b.

The V-groove width of each of the pair of variable pulleys 54, 56 changes, so the winding diameter (effective diameter) of the transmission belt 58 is changed. Thus, an actual speed ratio (gear ratio) γ (=Primary rotation speed Nin/Secondary rotation speed Nout) is continuously changed. For example, when the V-groove width of the primary pulley 54 is reduced, the speed ratio γ decreases. That is, the continuously variable transmission mechanism 20 is upshifted. When the V-groove width of the primary pulley 54 is increased, the speed ratio γ increases. That is, the continuously variable transmission mechanism 20 is downshifted.

The belt driving clutch Cb is inserted between the continuously variable transmission mechanism 20 and the output shaft 25. The belt driving clutch Cb selectively connects the continuously variable transmission mechanism 20 to the output shaft 25 or disconnects the continuously variable transmission mechanism 20 from the output shaft 25. When the belt driving clutch Cb is engaged, the first transmission path is established. In the first transmission path, torque of the engine 14 is transmitted to the output shaft 25 via the turbine shaft 26 and the continuously variable transmission mechanism 20. When the belt driving clutch Cb is released, the first transmission path is interrupted, and no torque is transmitted to the output shaft 25 via the continuously variable transmission mechanism 20.

The output gear 24 is in mesh with a large-diameter gear 62 fixed to a second counter shaft 60. The large-diameter gear 62 and a small-diameter gear 68 are provided on the second counter shaft 60. The small-diameter gear 68 is in mesh with a differential ring gear 66 of the differential gear 64. The differential gear 64 is formed of a differential mechanism. The differential gear 64 transmits power, input from the differential ring gear 66, to right and left drive wheels 70R, 70L while providing an appropriate rotation speed difference to the right and left drive wheels 70R, 70L. The differential gear 64 is a known technique, so the detailed description thereof is omitted.

Figure 3:
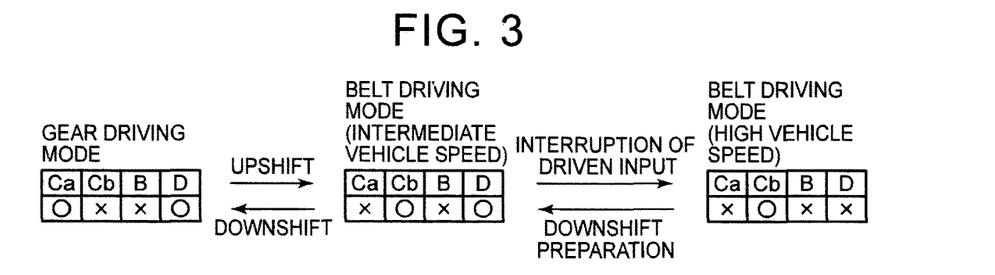
FIG. 3 is an engagement chart of engagement elements for each driving pattern in the driving system shown in FIG. 1.

Next, the operation of the thus-configured driving system 12 will be described by using an engagement chart of engagement elements for each driving pattern shown in FIG. 3. In FIG. 3, Ca corresponds to the operation state of the forward clutch Ca, Cb corresponds to the operation state of the belt driving clutch Cb, B corresponds to the operation state of the reverse brake B, D corresponds to the operation state of the dog clutch D, "O" indicates an engaged (connected) state, and "x" indicates a released (disconnected) state. The dog clutch D includes the synchromesh mechanism S. When the dog clutch D is engaged, the synchromesh mechanism S substantially operates. The forward clutch Ca and the belt driving clutch Cb correspond to a clutch mechanism that selectively changes a torque transmission path between a first path and a second path according to the invention. The belt driving clutch Cb corresponds to a first clutch and the clutch mechanism according to the invention. The forward clutch Ca corresponds to a second clutch and the clutch mechanism according to the invention.

Initially, the driving pattern in which torque of the engine 14 is transmitted to the output shaft 25 via the continuously variable transmission mechanism 20 will be described. This driving pattern corresponds to a belt driving mode (high vehicle speed) shown in FIG. 3. As shown in the belt driving mode of FIG. 3, the belt driving clutch Cb is connected, while the forward clutch Ca, the reverse brake B and the dog clutch D are disconnected. When the belt driving clutch Cb is connected, the secondary pulley 56 is connected to the output shaft 25, so the secondary pulley 56 integrally rotates with the output shaft 25 and the output gear 24. Thus, when the belt driving clutch Cb is connected, the first transmission path is established, and torque of the engine 14 is transmitted to the output shaft 25 and the output gear 24 via the torque converter 16, the turbine shaft 26, the primary shaft 32 and the continuously variable transmission mechanism 20. The torque transmitted to the output gear 24 is transmitted to the right and left drive wheels 70R, 70L via the large-diameter gear 62, the small-diameter gear 68 and the differential gear 64. The reason why the dog clutch D is released (disconnected) during the belt driving mode in which torque of the engine 14 is transmitted via the first transmission path is because a drag of the gear mechanism 22, or the like, is eliminated during the belt driving mode, and high rotation of the gear mechanism 22, or the like, is prevented at a high vehicle speed.

Subsequently, the driving pattern in which torque of the engine 14 is transmitted to the output shaft 25 via the gear mechanism 22, that is, the driving pattern in which torque is transmitted through the second transmission path, will be described. This driving pattern corresponds to the gear driving mode shown in FIG. 3. As shown in FIG. 3, the forward clutch Ca and the dog clutch D are engaged (connected), while the belt driving clutch Cb and the reverse brake B are released (disconnected).

When the forward clutch Ca is engaged, the planetary gear train 30 that constitutes the forward/reverse switching device 18 is integrally rotated, so the small-diameter gear 36 is rotated at the same rotation speed as the turbine shaft 26. When the dog clutch D is engaged, the counter shaft 38 and the idler gear 42 are connected to each other, and are integrally rotated. Thus, when the forward clutch Ca and the dog clutch D are engaged, the second transmission path is established, so power of the engine 14 is transmitted to the output shaft 25 and the output gear 24 via the torque converter 16, the turbine shaft 26, the forward/reverse switching device 18, the gear mechanism 22, the idler gear 42 and the input gear 52.

The gear driving mode is selected in a low vehicle speed region. A gear ratio EL (Rotation speed of the turbine shaft 26/Rotation speed of the output shaft 25) based on the second transmission path is set to a value higher than a maximum speed ratio γmax of the continuously variable transmission mechanism 20. That is, the gear ratio EL is set to a value that is not set in the continuously variable transmission mechanism 20. When the vehicle speed V falls within a predetermined belt driving region, in which the belt driving mode is set, as a result of, for example, an increase in the vehicle speed V, the driving pattern is changed to the belt driving mode. When the driving pattern is changed from the gear driving mode to the belt driving mode (high vehicle speed) or from the belt driving mode (high vehicle speed) to the gear driving mode, a belt driving mode (intermediate vehicle speed) shown in FIG. 3 is transitionally set.

For example, when the driving pattern is changed from the gear driving mode to the belt driving mode (high vehicle speed), the operation state is transitionally changed from the state where the forward clutch Ca and the dog clutch D, corresponding to the gear driving mode, are engaged to the state where the belt driving clutch Cb and the dog clutch D are engaged. That is, an engagement change (clutch-to-clutch shift) is started. In the engagement change, the forward clutch Ca is released, and the belt driving clutch Cb is engaged. At this time, the torque transmission path is changed from the second transmission path to the first transmission path, and the driving system 12 is substantially upshifted. After the torque transmission path is changed, the dog clutch D is released (disconnected) in order to prevent an unnecessary drag or high rotation of the gear mechanism 22, or the like.

When the driving pattern is changed from the belt driving mode (high vehicle speed) to the gear driving mode, the operation state is transitionally changed from the state where the belt driving clutch Cb is engaged to the state where the dog clutch D is engaged in preparation for changing into the gear driving mode (downshift preparation). At this time, rotation is also transmitted to the sun gear 30s of the planetary gear train 30 via the gear mechanism 22. When an engagement change (clutch-to-clutch shift) for engaging the forward clutch Ca and releasing the belt driving clutch Cb is carried out from this state, the torque transmission path is changed from the first transmission path to the second transmission path. At this time, the driving system 12 is substantially downshifted.

Figure 4:
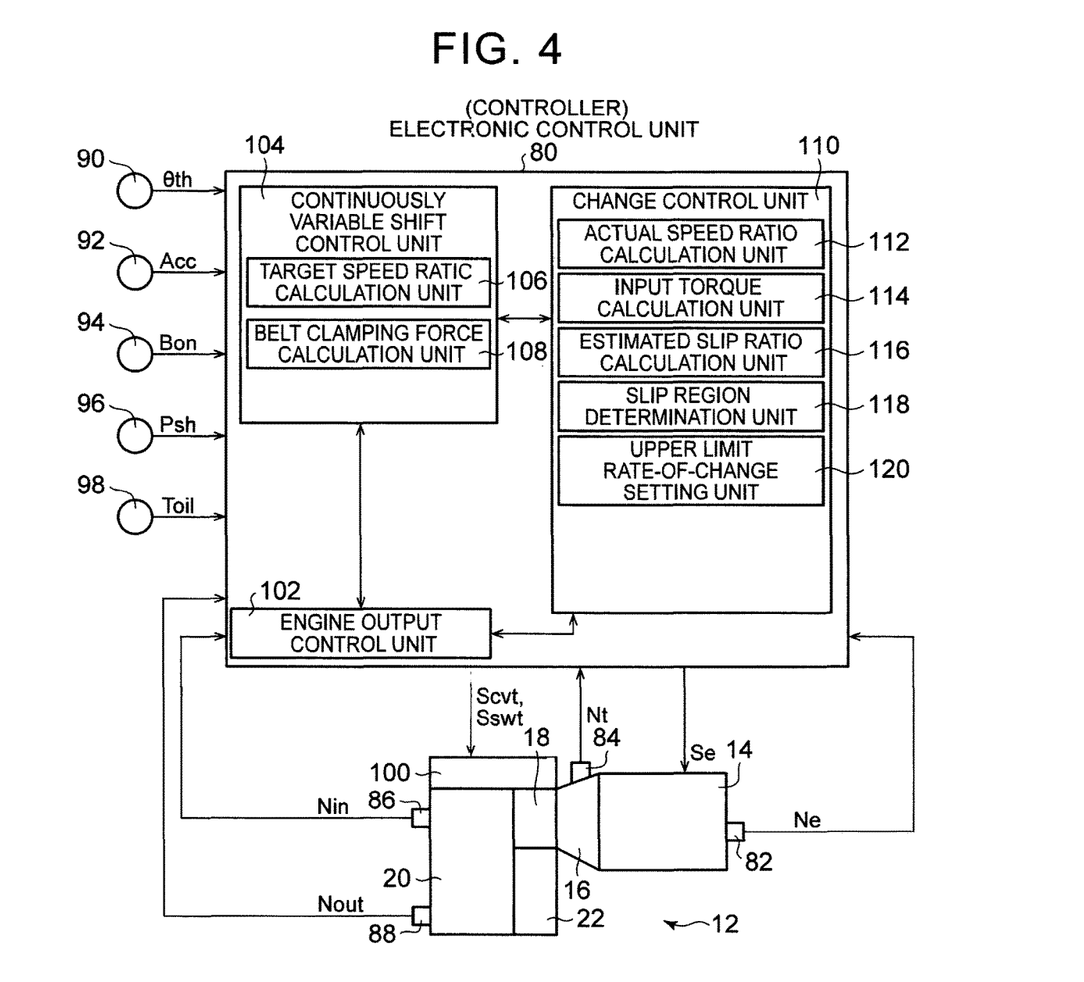
FIG. 4 is a functional block diagram that illustrates input/output lines of an electronic control unit provided in order to control an engine, the continuously variable transmission mechanism, and the like, in the driving system shown in FIG. 1, and that illustrates a relevant portion of control functions implemented by the electronic control unit.

FIG. 4 is a functional block diagram that illustrates input/output lines of an electronic control unit 80 (controller) provided in order to control the engine 14, the continuously variable transmission mechanism 20, and the like, and that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the driving system 12 by executing signal processing in accordance with programs prestored in the ROM while utilizing a temporary storage function of the RAM. For example, the electronic control unit 80 is configured to execute output control over the engine 14, shift control and belt clamping force control over the continuously variable transmission mechanism 20, control for appropriately changing the torque transmission path of the driving system 12 to one of the gear driving mode and the belt driving mode, and the like. Where necessary, the electronic control unit 80 is split into an electronic control unit for controlling the engine, an electronic control unit for controlling the continuously variable transmission mechanism, an electronic control unit for changing the driving pattern, or the like.

A signal indicating a rotation angle (position) Acr of the crankshaft and a rotation speed (engine rotation speed) Ne of the engine 14, a signal indicating a rotation speed (turbine rotation speed) Nt of the turbine shaft 26, a signal indicating a primary rotation speed Nin, a signal indicating a secondary rotation speed Nout, a signal indicating a throttle opening degree θth of an electronic throttle valve, a signal indicating an accelerator operation amount Acc, a signal indicating a brake signal Bon, a signal indicating a lever position (operating position) Psh of a shift lever, a signal indicating a hydraulic oil temperature Toil of hydraulic oil, and the like, are supplied to the electronic control unit 80. The rotation angle (position) Acr of the crankshaft and the engine rotation speed Ne are detected by an engine rotation speed sensor 82. The turbine rotation speed Nt is detected by a turbine rotation speed sensor 84. The primary rotation speed Nin is the rotation speed of the primary pulley 54 (primary shaft 32) of the continuously variable transmission mechanism 20, and is detected by a primary rotation speed sensor 86. the secondary rotation speed Nout is the rotation speed of the secondary pulley 56 of the continuously variable transmission mechanism 20, corresponds to the vehicle speed V, and is detected by a secondary rotation speed sensor 88. The throttle opening degree θth of the electronic throttle valve is detected by a throttle opening degree sensor 90. The accelerator operation amount Acc is the operation amount of an accelerator pedal as a driver's acceleration request amount, and is detected by an accelerator operation amount sensor 92. The brake signal Bon indicates a state where a foot brake is operated, and is detected by a foot brake switch 94. The foot brake is a service brake. The lever position (operating position) Psh of the shift lever is detected by a lever position sensor 96. The hydraulic oil temperature Toil of hydraulic oil that flows inside a hydraulic control circuit 100 is detected by an oil temperature sensor 98.

An engine output control command signal Se, a hydraulic control command signal Scvt, a hydraulic control command signal Sswt, and the like, are output from the electronic control unit 80. The engine output control command signal Se is used for output control over the engine 14. The hydraulic control command signal Scvt is used for hydraulic control associated with a shift of the continuously variable transmission mechanism 20. The hydraulic control command signal Sswt is used to control the forward/reverse switching device 18 (the forward clutch Ca, the reverse brake B), the belt driving clutch Cb and the dog clutch D associated with a change of the torque transmission path of the driving system 12. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 14 by an ignition device. A command signal for driving a linear solenoid valve (not shown) that regulates a primary pressure Pin, a command signal for driving a linear solenoid valve (not shown) that regulates a secondary pressure Pout, and the like, are output to the hydraulic control circuit 100 as the hydraulic control command signal Scvt. The primary pressure Pin is supplied to the primary hydraulic actuator 54c. The secondary pressure Pout is supplied to the secondary hydraulic actuator 56c. Command signals, and the like, for respectively driving linear solenoid valves that control hydraulic pressures that are supplied to the forward clutch Ca, the reverse brake B, the belt driving clutch Cb and the dog clutch D are output to the hydraulic control circuit 100 as the hydraulic control command signal Sswt.

Next, the control functions of the electronic control unit 80 will be described. An engine output control unit 102 (engine output control means) shown in FIG. 4, for example, outputs the engine output control command signal Se, such as the throttle signal, the injection signal and the ignition timing signal, to the throttle actuator, the fuel injection device and the ignition device in order to execute output control over the engine 14. The engine output control unit 102, for example, sets a target engine torque Te* for obtaining a required driving force (driving torque). The required driving force is calculated on the basis of the accelerator operation amount Acc and the vehicle speed V. The engine output control unit 102 controls not only the open/close of the electronic throttle valve by the throttle actuator but also the fuel injection amount by the fuel injection device and the ignition timing by the ignition device such that the target engine torque Te* is obtained.

A continuously variable shift control unit 104 (continuously variable shift control means) controls the speed ratio γ of the continuously variable transmission mechanism 20 such that a target speed ratio γ* is obtained. The target speed ratio γ* is calculated on the basis of the accelerator operation amount Acc, the vehicle speed V, the brake signal Bon, and the like. The continuously variable shift control unit 104 controls belt clamping force such that a slip does not occur in the continuously variable transmission mechanism 20.

The continuously variable shift control unit 104 functionally includes a target speed ratio calculation unit 106 (target speed ratio calculation means) and a belt clamping force calculation unit 108 (belt clamping force calculation means). The target speed ratio calculation unit 106 calculates the target speed ratio γ* of the continuously variable transmission mechanism 20 such that the operating point of the engine 14 is on an optimum fuel consumption line. The target speed ratio calculation unit 106, for example, determines a target primary rotation speed Nin* on the basis of an actual vehicle speed V and an actual accelerator operation amount Acc by consulting a correlation map between a vehicle speed V and a target primary rotation speed Nin* of the continuously variable transmission mechanism 20. The correlation map is determined and stored in advance with the accelerator operation amount Acc as a parameter. The target speed ratio calculation unit 106 calculates the target speed ratio γ*(=Nin*/Nout) on the basis of the set target primary rotation speed Nin* and the secondary rotation speed Nout detected by the secondary rotation speed sensor 88. Specifically, the continuously variable shift control unit 104 outputs a primary command pressure Pintgt to the hydraulic control circuit 100 such that the target speed ratio γ* of the continuously variable transmission mechanism 20 is achieved. The target speed ratio γ* of the continuously variable transmission mechanism 20 is set such that the operating point of the engine 14 is on the optimum fuel consumption line. The primary command pressure Pintgt is a command value of the primary pressure Pin (target primary pressure Pin*).

The belt clamping force calculation unit 108 calculates a target secondary pressure Pout* that is supplied to the secondary hydraulic actuator 56c. The target secondary pressure Pout* corresponds to an optimum target belt clamping force at which no slip occurs in the continuously variable transmission mechanism 20. The belt clamping force calculation unit 108, for example, determines the target secondary pressure Pout* (target belt clamping force) on the basis of an actual speed ratio γ and an actual accelerator operation amount Acc by consulting a correlation between a speed ratio γ and a target secondary pressure Pout* with the accelerator operation amount Acc as a parameter. The correlation is empirically obtained and stored in advance. The target secondary pressure Pout* is set such that a belt slip is suppressed. The continuously variable shift control unit 104 outputs a secondary command pressure Pouttgt to the hydraulic control circuit 100 such that the target secondary pressure Pout* for suppressing a belt slip in the continuously variable transmission mechanism 20 is achieved. The secondary command pressure Pouttgt is the target secondary pressure Pout*.

A change control unit 110 (change control means) executes change control for changing the driving pattern as needed into the belt driving mode using the first transmission path or the gear driving mode using the second transmission path. In the belt driving mode, torque of the engine 14 is transmitted to the output shaft 25 via the continuously variable transmission mechanism 20. In the gear driving mode, torque of the engine 14 is transmitted to the output shaft 25 via the gear mechanism 22.

For example, when the driving region of the driving system 12 changes from a preset gear driving region to a preset belt driving region as a result of, for example, an increase in the vehicle speed V during the gear driving mode, the change control unit 110 executes change control for changing the driving pattern from the gear driving mode to the belt driving mode. When the change control unit 110 changes the driving pattern from the gear driving mode to the belt driving mode, the change control unit 110 carries out a clutch-to-clutch shift (CtoC shift) for releasing the forward clutch Ca and engaging the belt driving clutch Cb, and then releases the dog clutch D, as shown in FIG. 3.

For example, when the driving region of the driving system 12 changes from the preset belt driving region to the preset gear driving region as a result of, for example, a decrease in the vehicle speed V during the belt driving mode, the change control unit 110 executes change control for changing the driving pattern from the belt driving mode to the gear driving mode. When the change control unit 110 changes the driving pattern from the belt driving mode to the gear driving mode, the change control unit 110 initially engages the dog clutch D and then carries out a clutch-to-clutch shift (CtoC shift) for engaging the forward clutch Ca and releasing the belt driving clutch Cb.

At the time of the clutch-to-clutch shift that is carried out during change control, the change control unit 110, for example, executes feedforward control for outputting preset hydraulic pressure command values, feedback control for outputting hydraulic pressure command values calculated as needed on the basis of a deviation between an actual speed ratio γ and a target speed ratio γ*, or control for outputting hydraulic pressure command values corrected as needed through the feedback control in combination with the feedforward control. The hydraulic pressure command values are respectively output as command pressures for the linear solenoid valves that control the forward clutch Ca and the belt driving clutch Cb. During a clutch-to-clutch shift, the speed ratio γ of the continuously variable transmission mechanism 20 is controlled at a constant value or substantially a constant value.

Incidentally, when the torque transmission path is changed between the first transmission path that allows torque to be transmitted via the continuously variable transmission mechanism 20 and the second transmission path that allows torque to be transmitted via the gear mechanism 22, the clutch-to-clutch shift is carried out between the forward clutch Ca and the belt driving clutch Cb. At this time, the input torque Tin to the continuously variable transmission mechanism 20 steeply changes. As the input torque Tin changes, a slip ratio SLIP(γ) of the transmission belt 58 of the continuously variable transmission mechanism 20 also significantly changes in a similar manner. Particularly, in a state where the speed ratio γ of the continuously variable transmission mechanism 20 is larger than 1.0, a rate of change ΔSLIP(γ) in the slip ratio SLIP(γ) further increases.

Figure 5:
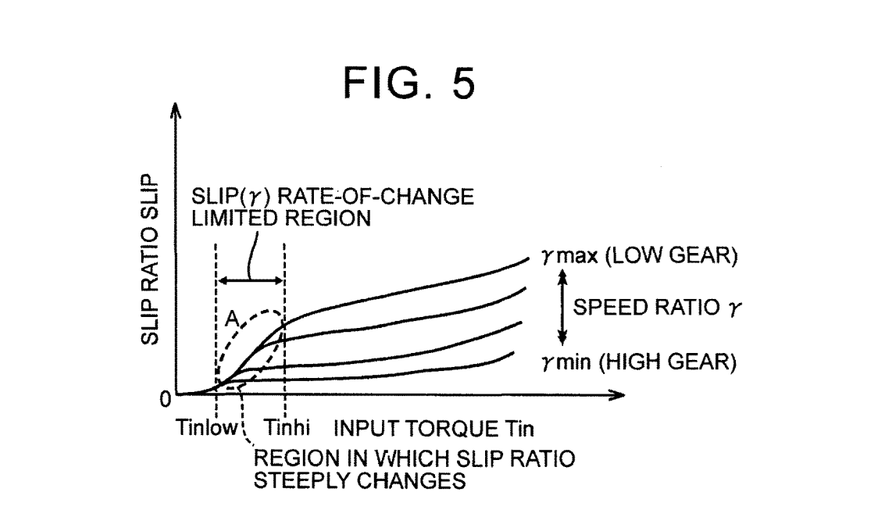
FIG. 5 is a graph that shows the correlation between an input torque and a slip ratio in the continuously variable transmission mechanism of the driving system shown in FIG. 1.

FIG. 5 shows the correlation between an input torque Tin and a slip ratio SLIP(γ). In FIG. 5, the abscissa axis represents the input torque Tin, and the ordinate axis represents the slip ratio SLIP(γ) of the transmission belt 58. In FIG. 5, the secondary pressure Pout of the secondary pulley 56 is constant. As is apparent from FIG. 5, the slip ratio SLIP(γ) increases with an increase in the input torque Tin, and the slip ratio SLIP(γ) increases with an increase in the speed ratio γ of the continuously variable transmission mechanism 20.

In a region A surrounded by the dashed line in FIG. 5, the slip ratio SLIP(γ) steeply changes. The region A surrounded by the dashed line is also called transition point, and is a region in which the mode of transmission of torque in the transmission belt 58 changes between transmission of torque by the annular rings 58a of the transmission belt 58 and transmission of torque by the elements 58b. More specifically, transmission of torque by the annular rings 58a (ring transmission) is carried out in a region in which the input torque Tin is small (the slip ratio SLIP(γ) is low); whereas transmission of torque by the elements 58b (element transmission) is carried out in a region in which the input torque Tin is large (the slip ratio SLIP(γ) is high). At the time of passage of the region A (transition point), the mode of transmission of torque in the transmission belt 58 changes. At this time, a transition state occurs between any adjacent elements 58b stacked along the annular rings 58a, and a change in the slip ratio SLIP increases. In the transition state, any adjacent elements 58b repeatedly get away from each other or get close to each other. Quick passage of the input torque Tin through the region A, that is, an increase in the change in the input torque Tin increases impact torque (impulse) that is generated at the time when any adjacent elements 58b get close to each other. Therefore, the amount of abrasion of each element 58b due to a collision between any adjacent element 58b increases, with the result that the durability of the transmission belt 58 decreases.

When the torque transmission path is changed between the first transmission path (belt driving mode) and the second transmission path (gear driving mode), the change control unit 110 executes control for limiting the rate of change VTin in the input torque Tin to a value lower than or equal to a predetermined upper limit rate of change when the input torque Tin falls within the region A shown in FIG. 5 during a clutch-to-clutch shift. Hereinafter, the control operations of the above-described change control unit 110 will be mainly described.

The change control unit 110 further functionally includes an actual speed ratio calculation unit 112 (actual speed ratio calculation means), an input torque calculation unit 114 (input torque calculation means), an estimated slip ratio calculation unit 116 (estimated slip ratio calculation means), a slip region determination unit 118 (slip region determination means), and an upper limit rate-of-change setting unit 120 (upper limit rate-of-change setting means). The actual speed ratio calculation unit 112 calculates an actual speed ratio γ (=Nin/Nout) as needed on the basis of the primary rotation speed Nin of the primary pulley 54 and the secondary rotation speed Nout of the secondary pulley 56.

The input torque calculation unit 114 calculates the input torque Tin that is input to the continuously variable transmission mechanism 20. The input torque calculation unit 114, for example, calculates the input torque Tin on the basis of an actual engine torque Te and an actual torque capacity (or clutch hydraulic pressure) of the belt driving clutch Cb by consulting an equation of motion or correlation map obtained and stored in advance. The equation of motion or correlation map is formed of an engine torque Te that is output from the engine 14 and a torque capacity (or clutch hydraulic pressure) of the belt driving clutch Cb.

The engine torque Te is, for example, estimated on the basis of an actual accelerator operation amount Acc and an actual vehicle speed V by consulting a correlation map for obtaining an engine torque Te. The correlation map is formed of an accelerator operation amount Acc and a vehicle speed V. Alternatively, the engine torque Te may be actually measured by a torque sensor, or the like. The torque capacity Tb of the belt driving clutch Cb is, for example, calculated on the basis of a command pressure of the belt driving clutch Cb and the specifications of the secondary hydraulic actuator 56c. The command pressure of the belt driving clutch Cb is output to the hydraulic control circuit 100. Instead of the command pressure of the belt driving clutch Cb, the belt driving clutch Cb may be directly detected by a hydraulic pressure sensor, or the like. The input torque Tin is calculated on the basis of an engine torque Te and a torque capacity Tb of the belt driving clutch Cb, which are obtained from the equation of motion or correlation map for obtaining a prescribed input torque Tin with the engine torque Te and the torque capacity Tb of the belt driving clutch Cb as parameters.

The estimated slip ratio calculation unit 116 calculates the slip ratio SLIP(γ) that indicates the degree of slip of the belt of the continuously variable transmission mechanism 20. The slip ratio SLIP(γ) of the continuously variable transmission mechanism 20 is calculated on the basis of the actual speed ratio γ calculated by the actual speed ratio calculation unit 112 and the input torque Tin calculated by the input torque calculation unit 114 by consulting the correlation between an input torque Tin and a slip ratio SLIP(γ) with the speed ratio γ shown in FIG. 5 as a parameter. The correlation shown in FIG. 5 shows known values empirically obtained and stored in advance for each vehicle.

The slip region determination unit 118 determines whether the calculated input torque Tin falls within the region A shown in FIG. 5. Specifically, the slip region determination unit 118 determines whether the calculated input torque Tin falls within a region (transition point) in which the slip ratio SLIP(γ) exceeds a preset permissible slip ratio rate of change (predetermined reference value). When the slip region determination unit 118 determines that the input torque Tin falls within the range of the region A (Lower limit value Tinlow<Tin<Upper limit value Tinhi), the upper limit rate-of-change setting unit 120 is executed. The lower limit value Tinlow and upper limit value Tinhi of the input torque Tin, which define the range of the region A, are empirically obtained and stored in advance. The lower limit value Tinlow and upper limit value Tinhi of the input torque Tin are respectively set to the lower limit value and upper limit value of a region in which the mode of transmission of torque in the continuously variable transmission mechanism 20 changes from transmission of torque by the annular rings 58a that constitute the transmission belt 58 to transmission of torque by the elements 58b that also constitute the transmission belt 58. For the purpose of preventing control hunting, hysteresis may be set between each of the lower limit value Tinlow and the upper limit value Tinhi in the case where the driving pattern is changed from the gear driving mode to the belt driving mode and a corresponding one of the lower limit value Tinlow and the upper limit value Tinhi in the case where the driving pattern is changed from the belt driving mode to the gear driving mode.

The upper limit rate-of-change setting unit 120 determines an upper limit rate of change α of the rate of change VTin in the input torque Tin, at which a target rate of change ΔSLIP(γ) in the slip ratio SLIP(γ) is lower than or equal to the preset permissible slip ratio rate of change. The permissible slip ratio rate of change is empirically obtained in advance, and is, for example, set to the threshold of a value at which the amount of abrasion of each element 58b does not lead to a decrease in the durability of the transmission belt 58 at the time when the input torque Tin passes through the region A (transition point).

Figure 6:
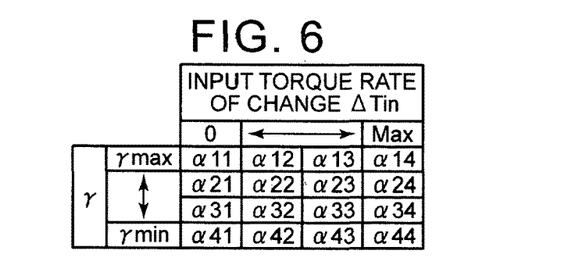
FIG. 6 is a correlation map of an upper limit rate of change, which is composed of a rate of change in input torque and a speed ratio of the continuously variable transmission mechanism.

FIG. 6 is a correlation map of the upper limit rate of change α (α11 to α44), which is empirically obtained and stored in advance and which is formed of an actual rate of change ΔTin in the input torque Tin and a speed ratio γ of the continuously variable transmission mechanism 20. The upper limit rate of change α is set on the basis of an actual rate of change ΔTin in the input torque Tin and a speed ratio γ of the continuously variable transmission mechanism 20 by consulting FIG. 6. The actual rate of change ΔTin in the input torque Tin is calculated from a difference between an input torque Tin(i) calculated at current time by the input torque calculation unit 114 and an input torque Tin(i−1) calculated in the last cycle. The upper limit rate-of-change setting unit 120 sets the upper limit rate of change α on the basis of the actual rate of change ΔTin in the input torque Tin and the speed ratio γ by consulting the correlation map shown in FIG. 6.

When the upper limit rate of change α for limiting the rate of change ΔSLIP(γ) in the slip ratio SLIP(γ) to the permissible slip ratio rate of change is set, the change control unit 110 calculates the clutch hydraulic pressures of the belt driving clutch Cb and forward clutch Ca at which the rate of change VTin in the input torque Tin is lower than or equal to the upper limit rate of change α, and corrects the outputs of the solenoid valves for controlling the belt driving clutch Cb and the forward clutch Ca as needed such that the calculated clutch pressures are obtained. Through control in this way, the upper limit rate of change α of the rate of change VTin in the input torque Tin to the continuously variable transmission mechanism 20 is set, and the rate of change VTin in the input torque Tin is limited to a value lower than or equal to the upper limit rate of change α. Therefore, impact torque (impulse) that is generated at the time when any adjacent elements 58b of the transmission belt 58 get close to each other is reduced, and the amount of abrasion of each element 58b is reduced. As a result, a decrease in the durability of the transmission belt 58 is suppressed.

When the clutch hydraulic pressures are limited by using the upper limit rate of change α, there is a case where the amount of change in each clutch hydraulic pressure increases and the influence on the shift characteristics of a clutch-to-clutch shift may increase. In such a case, a smoothing process for further setting a limited value for the amount of change in each clutch hydraulic pressure may be executed without correcting each clutch hydraulic pressure to the corresponding clutch hydraulic pressure limited by the upper limit rate-of-change setting unit 120. Alternatively, when the amount of change in each clutch hydraulic pressure resulting from correction is large, the correction value may be caused to gradually reach a target correction value through a tracking process (sweep process). When the corrected clutch hydraulic pressures are allowed to be reflected in the shift characteristics in the current shift, current corrected results of the clutch hydraulic pressures may be learned as subsequent command pressures of normal hydraulic control.

Because the engine torque Te of the engine 14 is transmitted to the continuously variable transmission mechanism 20, it is possible to control the input torque Tin by controlling the output of the engine 14. The change control unit 110 is able to control the rate of change VTin in the input torque Tin to a value lower than or equal to the upper limit rate of change α by controlling the output of the engine 14 instead of control using the clutch hydraulic pressures. The change control unit 110, for example, calculates the engine torque Te for setting the rate of change VTin in the input torque Tin to a value lower than or equal to the upper limit rate of change α from a preset map, or the like, that defines the upper limit value of the amount of change in engine output, and outputs a command value to the engine output control unit 102 such that the calculated engine torque Te is output. The upper limit value of the amount of change in engine output is a value at which the rate of change VTin in the input torque Tin is set to the upper limit rate of change α. When limitations, such as emission requirement, are imposed on the output of the engine 14, the change control unit 110 limits the input torque Tin by using the clutch hydraulic pressures as described above.

Figure 7:
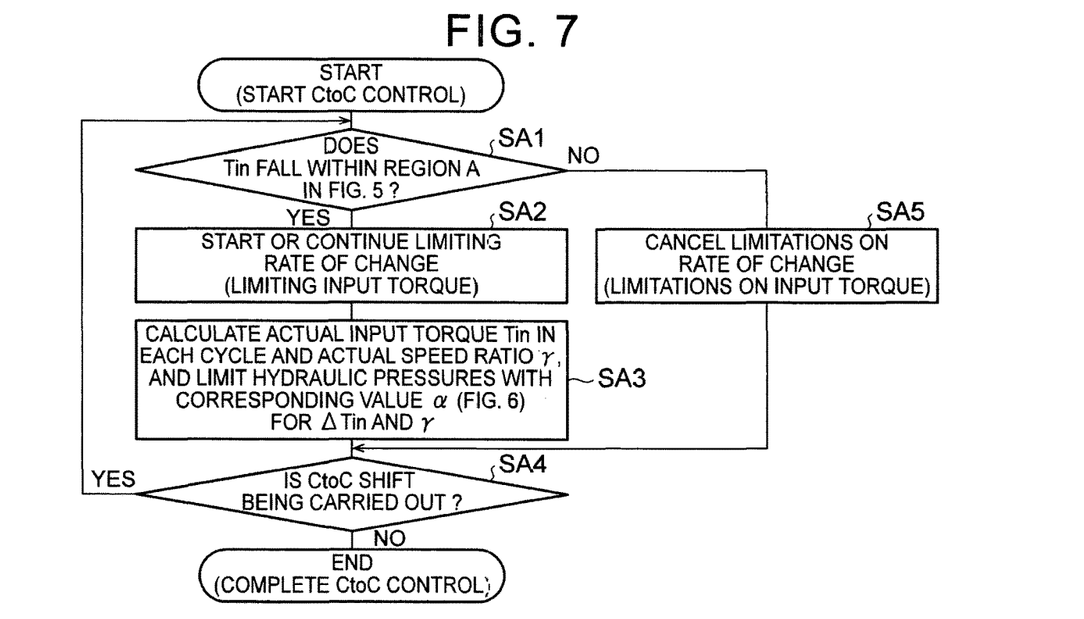
FIG. 7 is a flowchart for illustrating a relevant portion of control operations of the electronic control unit shown in FIG. 1, that is, control operations for suppressing belt abrasion that occurs during a change of the driving pattern when the driving pattern is changed from a belt driving mode to a gear driving mode or from the gear driving mode to the belt driving mode.

FIG. 7 is a flowchart for illustrating a relevant portion of control operations of the electronic control unit 80, that is, control operations for suppressing the amount of abrasion of the belt during a change of the driving pattern when the driving pattern is changed from the belt driving mode to the gear driving mode or from the gear driving mode to the belt driving mode. This flowchart is repeatedly executed at an extremely short cycle time of about several milliseconds to several tens of milliseconds.

When a clutch-to-clutch shift for changing the engaged/released states of the forward clutch Ca and belt driving clutch Cb is started, initially, it is determined in step SA1 (hereinafter, step is omitted) corresponding to the slip region determination unit 118 whether the input torque Tin falls within the range of the region A (Tinlow<Tin<Tinhi) shown in FIG. 5. When negative determination is made in SA1, the process proceeds to SA5. In SA5 corresponding to the change control unit 110, when limitations are imposed on the rate of change VTin in the input torque Tin, the limitations are cancelled, and a normal clutch-to-clutch shift of the forward clutch Ca and the belt driving clutch Cb is carried out. After that, the process proceeds to SA4. When affirmative determination is made in SA1, the process proceeds to SA2. In SA2 corresponding to the upper limit rate-of-change setting unit 120, when the upper limit rate of change α of the input torque Tin is not set, setting of the upper limit rate of change α is started; whereas, when setting of the upper limit rate of change α has been already started, setting of the upper limit rate of change α is continued. Subsequently, in SA3 corresponding to the actual speed ratio calculation unit 112, the input torque calculation unit 114, the upper limit rate-of-change setting unit 120 and the change control unit 110, an actual input torque Tin, an actual speed ratio γ and an actual rate of change ΔTin in the actual input torque Tin are calculated, and then the upper limit rate of change α is set on the basis of the correlation map shown in FIG. 6. The clutch hydraulic pressures of the belt driving clutch Cb and forward clutch Ca, at which the rate of change VTin in the input torque Tin is lower than or equal to the upper limit rate of change α, are calculated, and the clutch hydraulic pressures are corrected to the calculated hydraulic pressures. In addition, a clutch-to-clutch shift is carried out on the basis of the corrected clutch hydraulic pressures. In SA4 corresponding to the change control unit 110, it is determined whether the clutch-to-clutch shift is being carried out. When affirmative determination is made in SA4, the process returns to SA1, and the above-described control is continued. When negative determination is made in SA4, the routine is ended. Completion of the clutch-to-clutch shift is, for example, determined on the basis of whether the clutch hydraulic pressure of the belt driving clutch Cb or the clutch hydraulic pressure of the forward clutch Ca has reached a predetermined value.

As described above, according to the present embodiment, in a region in which the rate of change $\Delta SLIP(\gamma)$ in the slip ratio $SLIP(\gamma)$ of the transmission belt 58 with respect to a change in the input torque Tin exceeds the preset permissible slip ratio rate of change, a steep change in the slip ratio $SLIP(\gamma)$ is suppressed by limiting the rate of change VTin in the input torque Tin. Because a steep change in the slip ratio $SLIP(\gamma)$ is suppressed, a load on the transmission belt 58 is suppressed, so it is possible to suppress a decrease in the durability of the transmission belt 58.

According to the present embodiment, the input torque Tin to the continuously variable transmission mechanism 20 is controlled by controlling the clutch hydraulic pressures of the forward clutch Ca and belt driving clutch Cb. Thus, the rate of change VTin in the input torque Tin is also controlled by using the clutch hydraulic pressures of the forward clutch Ca and belt driving clutch Cb. Therefore, it is possible to limit the rate of change VTin in the input torque Tin to a value lower than or equal to the predetermined upper limit rate of change $\alpha$ by controlling these clutch hydraulic pressures.

According to the present embodiment, the torque Te that is output from the engine 14 is transmitted as the input torque Tin of the continuously variable transmission mechanism 20. Thus, it is possible to control the rate of change VTin in the input torque Tin by controlling the output of the engine 14, so it is possible to limit the rate of change VTin in the input torque Tin to a value lower than or equal to the predetermined upper limit rate of change $\alpha$ by controlling the output of the engine 14.

Next, another embodiment of the invention will be described. In the following description, like reference numerals denote portions common to those of the above-described embodiment, and the description is omitted.

Figure 8:
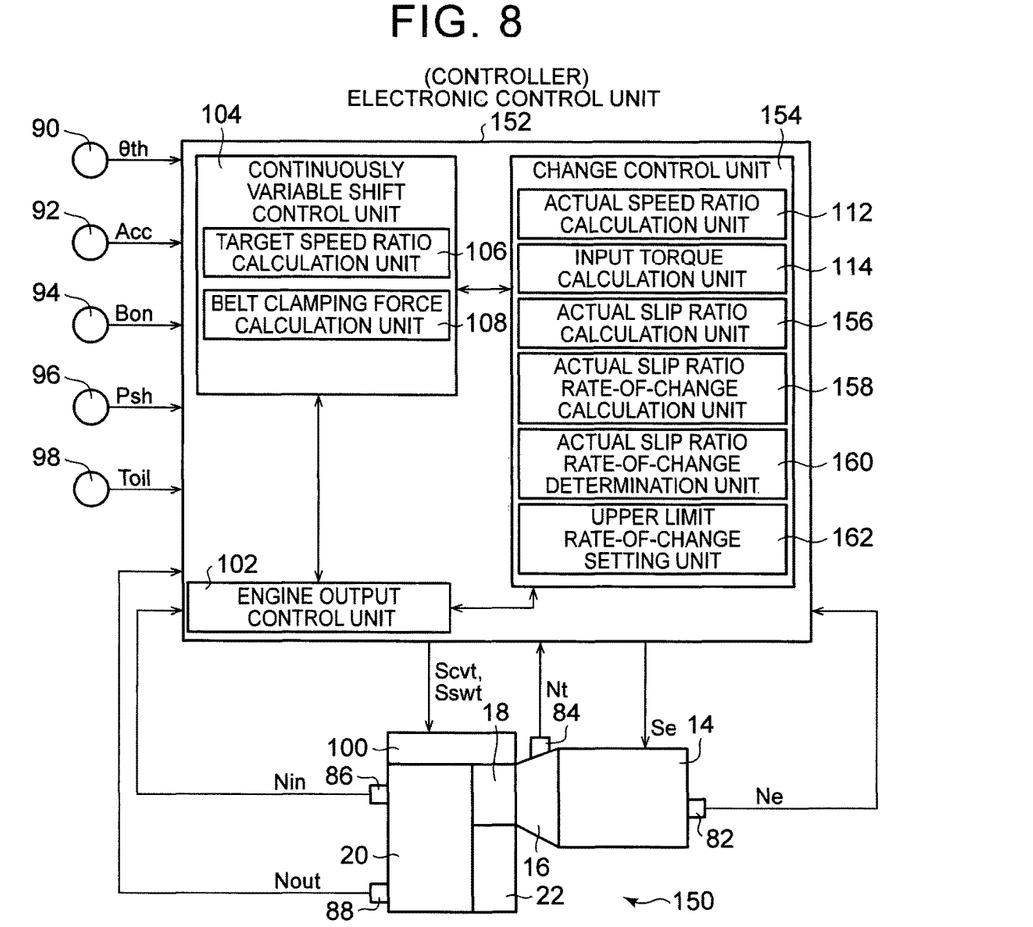
FIG. 8 is a functional block diagram that illustrates a relevant portion of control operations of an electronic control unit that controls a driving system according to another embodiment of the invention.

FIG. 8 is a functional block diagram that illustrates a relevant portion of control operations of an electronic control unit 152 (controller) that controls a driving system 150 according to another embodiment of the invention, and corresponds to FIG. 4 of the above-described embodiment. When the driving system 150 is compared with the above-described driving system 12, the basic configurations of these driving systems are the same, but only the control functions of the electronic control unit 152 for controlling the driving system 150 are different from the control functions of the electronic control unit 80. Hereinafter, the control operations of the electronic control unit 152, which are different from those of the above-described embodiment, will be described.

In the electronic control unit 152, a change control unit 154 (change control means) functionally includes the actual speed ratio calculation unit 112, the input torque calculation unit 114, an actual slip ratio calculation unit 156 (actual slip ratio calculation means), an actual slip ratio rate-of-change calculation unit 158 (actual slip ratio rate-of-change calculation means), an actual slip ratio rate-of-change determination unit 160 (actual slip ratio rate-of-change determination means), and an upper limit rate-of-change setting unit 162 (upper limit rate-of-change setting means). The actual speed ratio calculation unit 112 and the input torque calculation unit 114 have the same functions as those of the above-described embodiment, so the description thereof is omitted.

The actual slip ratio calculation unit 156 calculates an actual slip ratio $SLIPr(\gamma)$. The actual slip ratio $SLIPr(\gamma)$ is an actual slip ratio $SLIP(\gamma)$ of the transmission belt 58. The actual slip ratio $SLIPr(\gamma)$ is calculated on the basis of a secondary rotation speed Nout(Tin) and a secondary rotation speed Nout(Tin=0). The secondary rotation speed Nout(Tin) is the rotation speed of the secondary pulley 56 at the time when the input torque Tin is applied to the continuously variable transmission mechanism 20. The secondary rotation speed Nout(Tin=0) is the rotation speed of the secondary pulley 56 in a no-load state (Tin=0). More specifically, the actual slip ratio $SLIPr(\gamma)$ is calculated on the basis of the following mathematical expression (1). In the following mathematical expression (1), the secondary rotation speed Nout(Tin) is detected by the secondary rotation speed sensor 88 as needed. Nout(Tin=0) is the secondary rotation speed in the no-load state, and is empirically obtained and stored in advance.

$$SLIPr(\gamma)=1-Nout(Tin)/Nout(Tin=0) \quad (1)$$

The actual slip ratio rate-of-change calculation unit 158 calculates an actual rate of change $\Delta SLIPr(\gamma)$ in the actual slip ratio $SLIPr(\gamma)$ in each cycle (time step) on the basis of the actual slip ratio $SLIPr(\gamma)$ calculated by the actual slip ratio calculation unit 156. The actual rate of change $\Delta SLIPr(\gamma)$ is calculated from a difference $(=|SLIPr(\gamma)(i)-SLIPr(\gamma)(i-1)|)$ between an actual slip ratio $SLIPr(\gamma)(i)$ calculated in the current cycle (time step) and an actual slip ratio $SLIPr(\gamma)(i-1)$ calculated in the last cycle (time step).

The actual slip ratio rate-of-change determination unit 160 determines whether the actual rate of change $\Delta SLIPr(\gamma)$ calculated by the actual slip ratio rate-of-change calculation unit 158 is higher than or equal to a preset permissible slip rate of change $\beta$ (predetermined threshold). The permissible slip rate of change $\beta$ is a value empirically obtained in advance, and is, for example, set to the threshold of a value at which the amount of abrasion of each element 58b does not lead to a decrease in the durability of the transmission belt 58. When the calculated actual rate of change $\Delta SLIPr(\gamma)$ exceeds the permissible slip rate of change $\beta$, the actual slip ratio rate-of-change determination unit 160 makes affirmative determination, and the upper limit rate-of-change setting unit 162 is executed.

Figure 9:
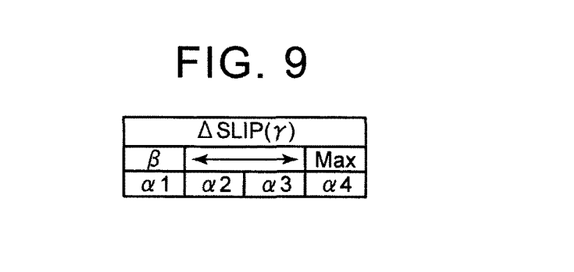
FIG. 9 is a correlation map of an upper limit rate of change, which is composed of a rate of change in slip ratio.

The upper limit rate-of-change setting unit 162 sets the upper limit rate of change $\alpha$ of the input torque Tin at which the actual rate of change $\Delta SLIPr(\gamma)$ is lower than or equal to the permissible slip rate of change $\beta$. The upper limit rate-of-change setting unit 162 sets the upper limit rate of change $\alpha$ on the basis of a map shown in FIG. 9. FIG. 9 is a correlation map of the upper limit rate of change $\alpha$ ($\alpha 1$ to $\alpha 4$) of the input torque Tin, which is empirically obtained and stored in advance and which is formed of a rate of change $\Delta SLIP(\gamma)$ in slip ratio $SLIP(\gamma)$. The upper limit rate of change $\alpha$ is set on the basis of the correlation map shown in FIG. 9.

When the upper limit rate of change $\alpha$ of the input torque Tin at which the actual rate of change $\Delta SLIPr(\gamma)$ is lower than or equal to the permissible slip rate of change $\beta$ set by the upper limit rate-of-change setting unit 162, the change control unit 154 calculates the clutch hydraulic pressures of the belt driving clutch Cb and forward clutch Ca at which the rate of change VTin in the input torque Tin is lower than or equal to the upper limit rate of change α, and corrects the outputs of the solenoid valves that control the belt driving clutch Cb and the forward clutch Ca as needed such that the calculated clutch hydraulic pressures are obtained. Through control in this way, the upper limit rate of change α of the rate of change VTin in the input torque Tin to the continuously variable transmission mechanism 20 is set, and a change in the input torque Tin is limited to a value lower than or equal to the upper limit rate of change α. Therefore, impact torque (impulse) that is generated at the time when any adjacent elements 58b of the transmission belt 58 get close to each other is reduced, and the amount of abrasion of each element 58b is reduced. As a result, a decrease in the durability of the transmission belt 58 is suppressed.

Figure 10:
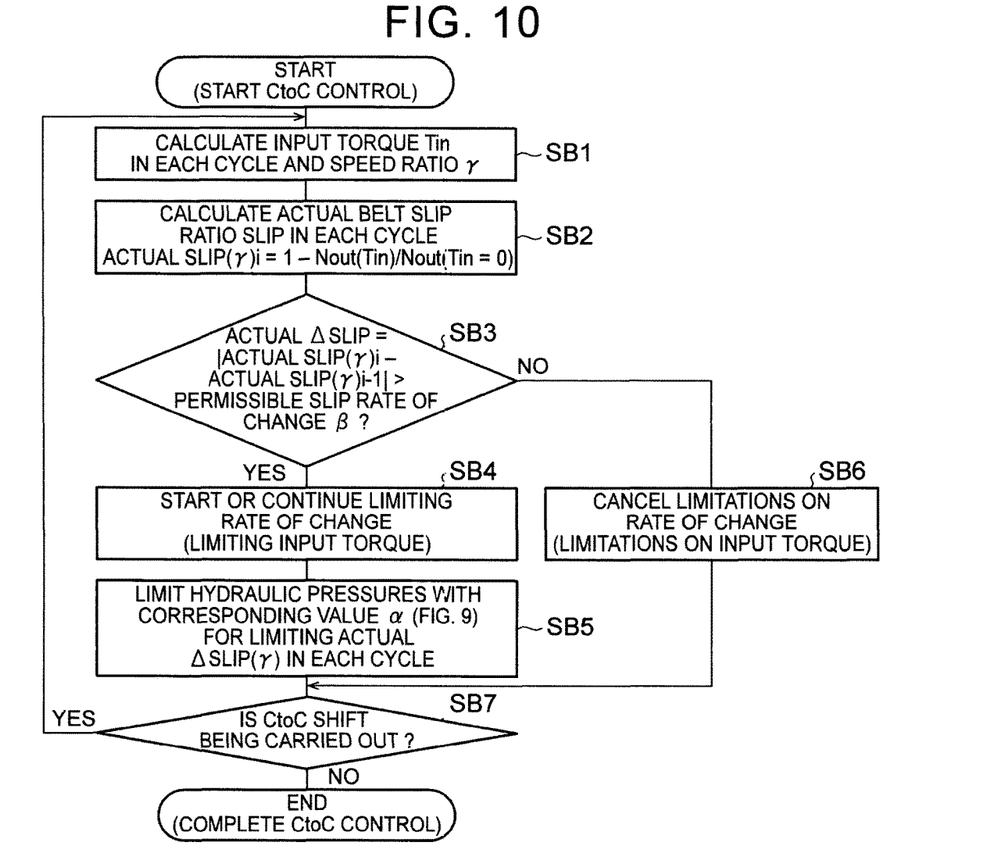
FIG. 10 is a flowchart for illustrating a relevant portion of control operations of the electronic control unit shown in FIG. 8, that is, control operations for suppressing belt abrasion that occurs during a change of the driving pattern when the driving pattern is changed from the belt driving mode to the gear driving mode or from the gear driving mode to the belt driving mode.

FIG. 10 is a flowchart for illustrating a relevant portion of control operations of the electronic control unit 152 according to the present embodiment, that is, control operations for suppressing the amount of abrasion of the belt during a change of the driving pattern when the driving pattern is changed from the belt driving mode to the gear driving mode or from the gear driving mode to the belt driving mode. This flowchart is repeatedly executed at an extremely short cycle time of about several milliseconds to several tens of milliseconds.

When a clutch-to-clutch shift for changing the engaged/released states of the forward clutch Ca and belt driving clutch Cb is started, initially, the actual input torque Tin and the actual speed ratio γ are calculated in SB1 corresponding to the actual speed ratio calculation unit 112 and the input torque calculation unit 114. Subsequently, in SB2 corresponding to the actual slip ratio calculation unit 156, the actual slip ratio SLIPr(γ) (=1−Nout(Tin)/Nout(Tin=0)) is calculated. In SB3 corresponding to the actual slip ratio rate-of-change calculation unit 158 and the actual slip ratio rate-of-change determination unit 160, it is determined whether the difference (=|SLIPr(γ)(i)−SLIPr(γ)(i−1)|) between the actual slip ratio SLIPr(γ)(i) calculated in the current cycle and the actual slip ratio SLIPr(γ)(i−1) calculated in the last cycle is larger than the preset permissible slip rate of change β. When negative determination is made in SB3, the process proceeds to SB6. In SB6 corresponding to the change control unit 154, when limitations are imposed on the rate of change VTin in the input torque Tin, the limitations are cancelled, and a normal clutch-to-clutch shift is carried out. When no limitations are imposed on the rate of change VTin in the input torque Tin, a normal clutch-to-clutch shift is continued.

On the other hand, when affirmative determination is made in SB3, the process proceeds to SB4. In SB4 corresponding to the upper limit rate-of-change setting unit 162, limiting the rate of change VTin in the input torque Tin is started; whereas, when the rate of change VTin in the input torque Tin has been already limited, limiting the rate of change VTin in the input torque Tin is continued. In SB5 corresponding to the upper limit rate-of-change setting unit 162 and the change control unit 154, the upper limit rate of change α is set on the basis of the map shown in FIG. 9. Changes in the clutch hydraulic pressures of the belt driving clutch Cb and forward clutch Ca are limited such that the rate of change VTin is lower than or equal to the upper limit rate of change α. In SB7 corresponding to the change control unit 154, it is determined whether a clutch-to-clutch shift is being carried out. When affirmative determination is made in SB7, the process returns to SB1, and the above-described control is repeatedly executed until the clutch-to-clutch shift completes. When negative determination is made in SB7, the routine is ended.

As described above, according to the present embodiment, when the rate of change ΔSLIP(γ) in the actual slip ratio SLIP(γ) is higher than the preset permissible slip rate of change β, a steep change in the slip ratio SLIP(γ) is suppressed by limiting the rate of change VTin in the input torque Tin that is input to the continuously variable transmission mechanism 20. Because a steep change in the slip ratio SLIP(γ) is suppressed, a load on the transmission belt 58 is suppressed, so it is possible to suppress a decrease in the durability of the transmission belt 58.

The embodiments of the invention are described in detail with reference to the drawings; however, the invention is also applicable to another mode.

Figure 11:
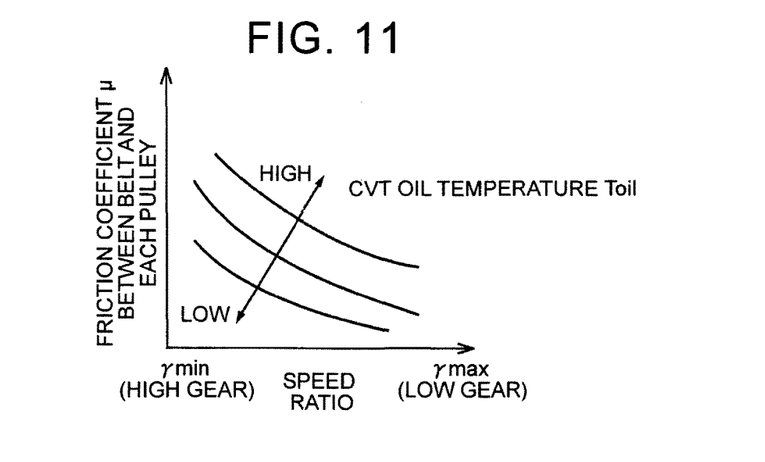
FIG. 11 is a graph that shows the temperature characteristics of a friction coefficient.

For example, in the above-described embodiments, a clutch-to-clutch shift may be carried out further in consideration of the hydraulic oil temperature Toil of hydraulic oil that is supplied to the forward clutch Ca, the belt driving clutch Cb, and the like. FIG. 11 shows the temperature characteristics of a friction coefficient between each element 58b and each of the pulleys 54, 56. In FIG. 11, the abscissa axis represents the speed ratio γ, and the ordinate axis represents the friction coefficient μ between the transmission belt 58 and each of the pulleys 54, 56. Each line in the graph indicates characteristics for a constant oil temperature. From FIG. 11, the friction coefficient μ increases as the oil temperature Toil increases. Therefore, the slip ratio SLIP(γ) is corrected in response to the oil temperature Toil in consideration of the characteristics. In this way, when the slip ratio SLIP(γ) is corrected in response to the oil temperature Toil, control accuracy during changing further improves.

In the above-described embodiments, the map shown in FIG. 6 is set on the basis of the speed ratio γ and the actual rate of change ΔTin in the input torque Tin. Instead, the map shown in FIG. 6 may be set on the basis of the speed ratio γ and the input torque Tin.

In the above-described embodiments, the upper limit rate of change α of the input torque Tin is defined in each of the map shown in FIG. 6 and the map shown in FIG. 9. Instead, for example, the upper limit value of a rate of change in the torque capacity of each of the belt driving clutch Cb and the forward clutch Ca or the upper limit value of a rate of change in each clutch hydraulic pressure may be defined.

In the above-described embodiments, at the time when the input torque Tin is limited to a value lower than or equal to the upper limit rate of change α, limitations through control over the clutch hydraulic pressures and limitations through control over the output of the engine may be carried out in combination.

The dog clutch D according to the above-described embodiments are not necessarily required, and the dog clutch D may be omitted.

In the above-described embodiments, the engine 14 is employed as a driving force source; however, the driving force source is not always limited to the engine 14. For example, the driving force source may be an electric motor, or the like, as needed as long as the electric motor functions as the driving force source.

The above-described embodiments are only illustrative, and the invention may be implemented in modes including various modifications or improvements on the basis of the knowledge of persons skilled in the art.

What is claimed is:

1. A driving system for a vehicle, the vehicle including a driving force source;
a drive wheel;
a continuously variable transmission mechanism; and
at least one electronic control unit, wherein
the continuously variable transmission mechanism includes:
an input shaft to which torque output from the driving force source is transmitted,
an output shaft configured to output torque to the drive wheel,
a pair of pulleys, and
a transmission belt arranged between the input shaft and the output shaft, the transmission belt being wound to span between the pair of pulleys,
a gear train that includes at least two gears and has at least one gear ratio, and
a clutch mechanism including a first clutch and a second clutch, the clutch mechanism being configured to selectively change a torque transmission path between a first path and a second path, the first path being a path through which torque is transmitted via the continuously variable transmission mechanism, the first path being established when the first clutch is engaged, the second path being a path through which torque is transmitted via the gear mechanism, the second path being established when the second clutch is engaged, and
the at least one electronic control unit is configured to:
i) selectively change the torque transmission path between the first path and the second path based on a traveling state of the vehicle, and
ii) when the torque transmission path is changed between the first path and the second path by operating the clutch mechanism:
a) calculate a rate of change in an actual slip ratio of the transmission belt, and
b) when the calculated rate of change in the actual slip ratio is higher than a predetermined threshold set in advance: control input torque that is input to the continuously variable transmission mechanism such that a rate of change in the input torque is limited to a value lower than or equal to a predetermined upper limit rate of change.

2. The driving system according to claim 1, wherein
the first clutch is a hydraulic clutch, and
the second clutch is another hydraulic clutch, and
the electronic control unit is configured to limit the rate of change in the input torque, which is input to the continuously variable transmission mechanism, to the value lower than or equal to the predetermined upper limit rate of change by controlling clutch hydraulic pressures for changing engaged-released states of the first clutch and the second clutch.

3. The driving system according to claim 1, wherein the electronic control unit is configured to limit the rate of change in the input torque, which is input to the continuously variable transmission mechanism, to the value lower than or equal to the predetermined upper limit rate of change by controlling the torque output from the driving force source.

* * * * *